(12) United States Patent
Lorhammer et al.

(10) Patent No.: US 7,795,757 B2
(45) Date of Patent: Sep. 14, 2010

(54) POWER ELECTRONIC ARCHITECTURE FOR MANAGING FUEL CELL MODULES AND METHOD THEREFOR

(75) Inventors: Kurt M. Lorhammer, Issaquah, WA (US); Porter J. Hill, Burley, ID (US); Arthur E. Brockschmidt, Renton, WA (US); Sridhar K. Iya, Gig Harbor, WA (US); Shengyi Liu, Mercer Island, WA (US); George M. Roe, Seattle, WA (US)

(73) Assignee: The Boeing Company, Seattle, WA (US)

( * ) Notice: Subject to any disclaimer, the term of this patent is extended or adjusted under 35 U.S.C. 154(b) by 271 days.

(21) Appl. No.: 12/041,502

(22) Filed: Mar. 3, 2008

(65) Prior Publication Data

US 2009/0218888 A1 Sep. 3, 2009

(51) Int. Cl.
*H02J 1/00* (2006.01)
*H02J 3/00* (2006.01)
(52) U.S. Cl. .............................. 307/82; 307/45; 307/86
(58) Field of Classification Search .................. 307/45, 307/82, 86
See application file for complete search history.

(56) References Cited

U.S. PATENT DOCUMENTS

| 2001/0049038 A1* | 12/2001 | Dickman et al. ............... 429/19 |
| 2009/0212764 A1* | 8/2009 | Kagan et al. ................ 324/142 |
| 2010/0001583 A1* | 1/2010 | Ichikawa ................... 307/10.1 |

OTHER PUBLICATIONS

Wenkai Wu, N. Pongratananukul, Weihong, Qui, K. Rustom, T. Kasparis, and I. Batarseh "DSP-Based Multiple Peak Power Tracking For Expandable Power System" 2003 IEEE.

* cited by examiner

*Primary Examiner*—Albert W Paladini
*Assistant Examiner*—Carlos Amaya
(74) *Attorney, Agent, or Firm*—Weiss & Moy, P.C.

(57) ABSTRACT

A system for managing electrical power has a plurality of storage devices. A plurality of DC-DC power converters are provided wherein one DC-DC power converter is coupled to each of the plurality of storage devices. Outputs of the plurality of DC-DC power converters are coupled in parallel to form a distribution bus. A plurality of sensors is coupled to the outputs of the plurality of DC-DC power converters for power monitoring of the system. A control unit is coupled to the plurality of sensors and to the plurality of DC-DC power converters to regulate an output signal of each DC-DC power converter based on signals received from the sensors

20 Claims, 3 Drawing Sheets

POWER ELECTRONIC ARCHITECTURE FOR MANAGING FUEL CELL MODULES AND METHOD THEREFOR

BACKGROUND

Embodiments of this disclosure relate generally to a power electronic architecture, and more particularly, to a power electronic architecture that manages the electrical power from fuel cell stacks or other electrical generators and storage devices and provides dynamic power sharing and conditioning for use on a power bus.

A fuel cell is an electrochemical energy conversion device. Fuel cells provide electrical energy from an electrochemical reaction between two or more reactants. In general, fuel cells include two electrodes called an anode and a cathode. A solid electrolyte is generally disposed between the electrodes. The anode contains an anode catalyst, and the cathode contains a cathode catalyst.

The fuel cell produces electricity from various external quantities of fuel on the anode side and oxidant on the cathode side that react in the presence of the electrolyte. Generally, the reactants flow in and reaction products flow out while the electrolyte remains in the fuel cell. Fuel cells can operate virtually continuously as long as the necessary flows are maintained.

Fuel cells operate at approximately 0.7 volts, therefore, several fuel cells are generally grouped together into fuel cell stack to produce higher voltages. For even higher power rating uses, fuel cell modules are grouped together in different architectures to meet generation capacity. However, in developing a fuel cell based power generation system, a system design is required to condition the fuel cell power to keep within bus limits, allow parallel operation of fuel cell stacks of different size and voltage level and manage the fuel cell and battery power contribution to the electrical loads during different system operation modes.

Presently, fuel cell based power systems typically rely on costly custom power converters to control the power distribution. However, the power converters are generally limited to a single power source such as one fuel cell stack. Furthermore, control algorithms within the existing solution power converters, use the duty cycle input of the power converter for direct switching control which requires detailed design of the converter to be matched with the fuel cell. Existing solutions also do not provide a means for power sharing at different power levels and dynamic adjustment to the power sharing ratios such that different sized fuel cell stacks with different operating characteristics can successfully interfaced.

Therefore, it would be desirable to provide a system method that overcomes the above problems. The system and method would manage the electrical power from fuel cell stacks or other electrical generators and storage devices providing dynamic power sharing and conditioning for use on a power bus.

SUMMARY

A system for managing electrical power has a plurality of storage devices. A plurality of DC-DC power converters are provided wherein one DC-DC power converter is coupled to each of the plurality of storage devices. Outputs of the plurality of DC-DC power converters are coupled in parallel to form a distribution bus. A plurality of sensors is coupled to the outputs of the plurality of DC-DC power converters for power monitoring of the system. A control unit is coupled to the plurality of sensors and to the plurality of DC-DC power converters to regulate an output signal of each DC-DC power converter based on signals received from the sensors.

A system for managing electrical power has a plurality of storage modules wherein each storage module outputs a DC signal. A plurality of DC-DC power converters are provided wherein one DC-DC power converter is coupled to each of the plurality of storage modules. Outputs of the plurality of DC-DC power converters are coupled in parallel to form a distribution bus. A plurality of current sensors is provided wherein one current sensor is coupled to an output of each of the plurality of DC-DC power converters. At least one voltage sensor so coupled to the distribution bus. A control unit is coupled to the plurality of current sensors, the at least one voltage sensor, and to the plurality of DC-DC power converters to regulate output signals of each DC-DC power converter.

A method for managing electrical power comprises: coupling a current sensor to an output of each of a plurality of DC-DC power converters of a DC distribution bus system; coupling a voltage sensor to the DC distribution bus system; coupling a control unit to the plurality of current sensors, the at least one voltage sensor, and to the plurality of DC-DC power converters to regulate output signals of each DC-DC power converter.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
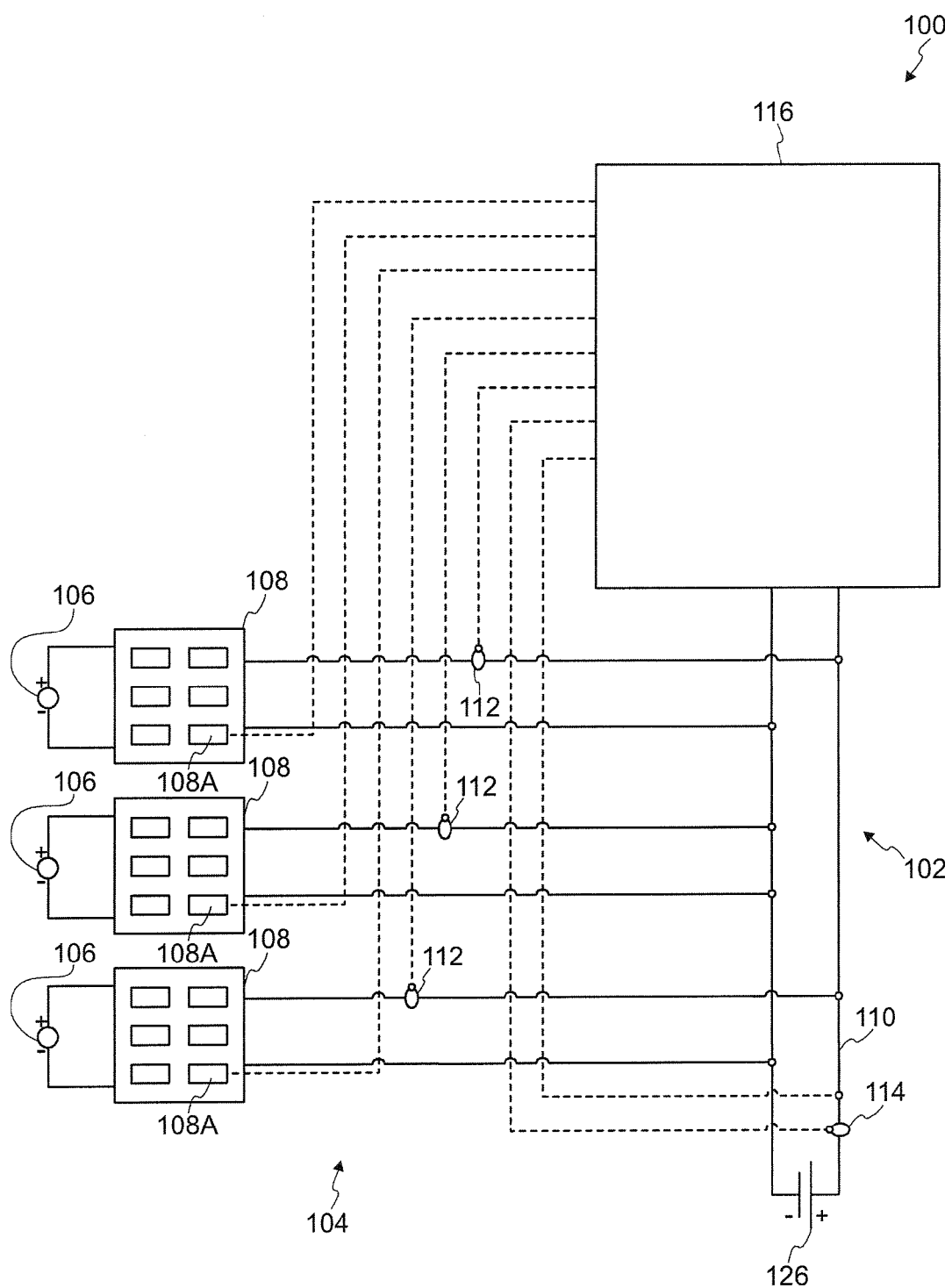
FIG. 1 is a block diagram of a control system that manages electrical power from fuel cell modules and provides dynamic power sharing and conditioning for use on a power bus.

With reference now to FIG. 1, a simplified block diagram of a power distribution system 100 is shown. The power distribution system 100 manages electrical power from a plurality fuel cells, fuel cell stacks/modules, electrical generators, and other types of storage devices (hereinafter fuel cell modules). The power distribution system 100 allows power sharing between different fuel cell modules where an even distribution of power is not feasible. The power distribution system 100 further provides a dynamically changing power ratio for different modes of operation to account for various fuel cell modules operating characteristics.

The power distribution system 100 has a control system 102. The control system 102 is coupled to a plurality of fuel cell modules arranged in a DC bus distribution configuration 104. The control system 102 allows one to manage electrical power from the plurality fuel cell modules and to allow power sharing between different fuel cell modules where an even distribution of power is not feasible. The control system 102 further provides a dynamically changing power ratio for different modes of operation to account for various fuel cell modules operating characteristics.

As an example, a fuel cell system designed to output 10 kW net power may be supplied by four (4) fuel cell modules. The fuel cell modules could be of different size such that the fuel cell modules nominally provide 5 kW, 2 kW, 2 kW and 1 kW. This equates to a power sharing ratio of 50%, 20%, 20% from 10%. However, depending on system configurations, from power output of 0-5 kW it may be desired to operate such that the fuel cell modules are actually providing different ratios such that at 5 kW the same 4 stacks might be providing 2 kW, 1 kW, 1 kW and 1 kW respectively. This differing power share ration could change under each operating condition for several reasons, but is fully realizable with the power distribution system 100.

As stated above, the control system 102 is coupled to a plurality of fuel cell modules arranged in a DC bus distribution configuration 104. The DC bus configuration 104 comprises a plurality of DC outputs 106 from respective fuel cell modules. Each DC output 106 is coupled in series to a DC-DC power converter 108. Outputs of each DC-DC power converter 108 are coupled together in a parallel manner to form a distribution bus 110. The power that is generated by the fuel cell modules is supplied to the distribution bus 110 which consumes electrical energy, and to a battery 126 which stores electrical energy.

The DC-DC power converter 108 is used to convert the source of the DC output 106 from one voltage level to another. The DC-DC power converter 108 allows one to individually control the DC output 106 of each fuel cell module. Regulating the output of the DC-DC power converter 108 creates independence between the source (i.e., fuel module) and the DC bus configuration 104. This allows power sharing between different fuel cell modules where an even distribution of power is not feasible and allows for dynamically changing power ratios for different modes of operation to account for various fuel cell modules operating characteristics.

Each DC-DC power converter 108 is designed such that the input range is greater than the output operating range of the power distribution system 100. The output voltage of each DC-DC power converter 108 is set to match requirements of the distribution bus 110. The number of parallel elements is selected by the fuel cell output power (current) at the rated voltages.

The control system 102 uses a plurality of current sensors 112 and at least one voltage sensor 114. An individual current sensor 112 is generally located at the output of each DC-DC power converter 108. The voltage sensor 114 is coupled to the distribution bus 110. The current sensors 112 and the voltage sensor 114 are used for power monitoring on the distribution bus 110.

The current sensors 112 and the voltage sensors 114 are coupled to a control unit 116. The control unit 116 is further coupled to each DC-DC power converter 108 and to the battery 126. The control unit 116 is used for controlling the operating current of the fuel cell modules and thus the value of power generated thereby. By controlling the power generated, the control unit 116 also controls the amounts of charging power and discharging power for the battery 126. The control unit 116 monitors the current sensors 112 and the voltage sensors 114 for power monitoring of the power distribution system 100. The control unit 116 will send signals to each DC-DC power converter 108 to regulate the output each DC-DC power converter 108 based or the signals received from the current sensors 112 and the voltage sensor 114. The control unit 116 is generally coupled to a trim pin 108A of the DC-DC power converter 108. By adjusting the trim pin 108A, the output of the DC-DC power converter 108 can be regulated thereby creating independence between the source (i.e., fuel module) and the DC bus configuration 104.

Figure 2:
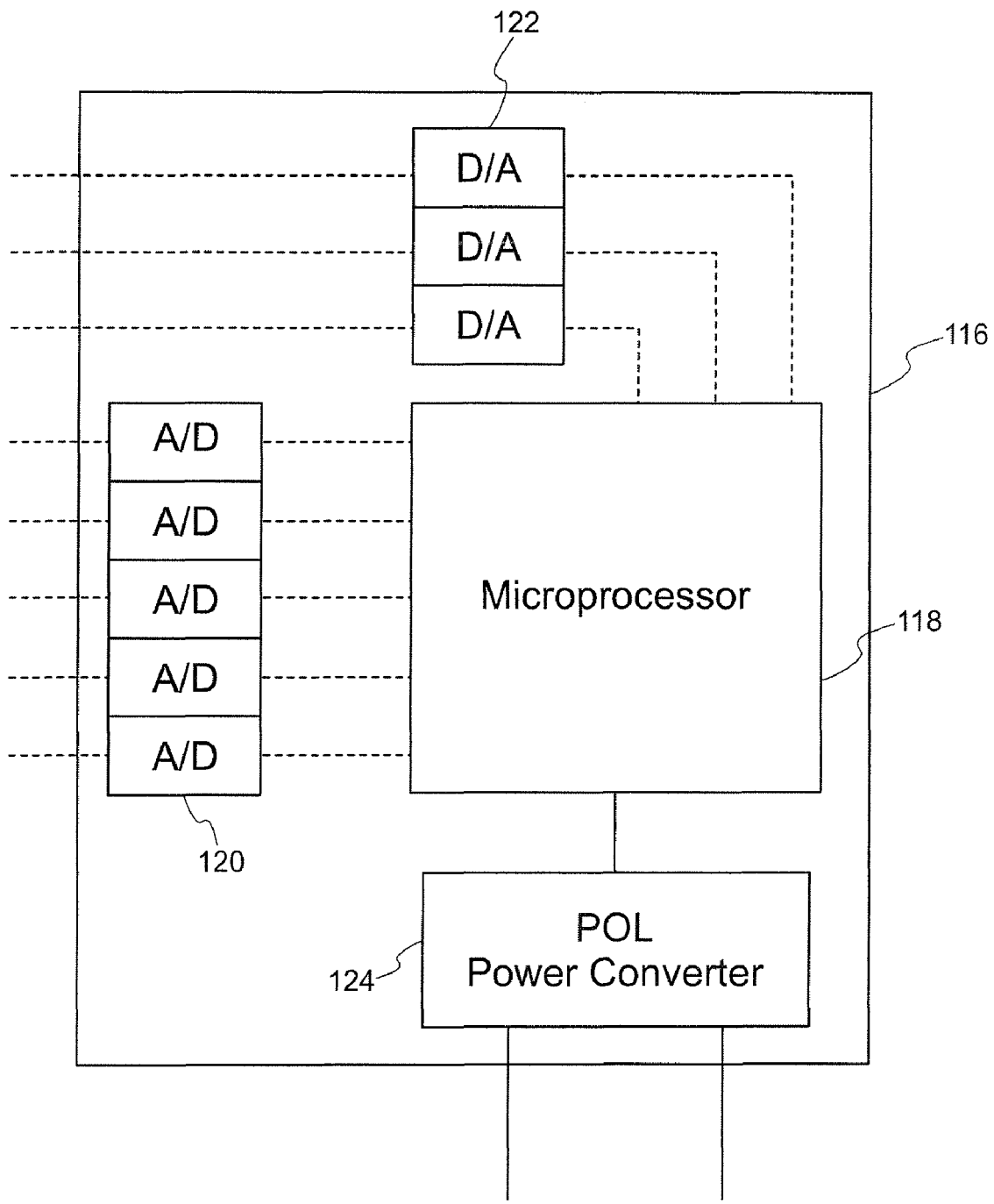
FIG. 2 is a block diagram of the control module of the control system of FIG. 1.

As shown in FIG. 2, the control unit 116 comprises a processor 118. The processor 118 is coupled to each of the current sensors 112, the voltage sensor 114, and to the trim pin 108A of each of the DC-DC power converters 108. The processor 118 will cycle through the readings on the current sensors 112 and the voltage sensor 114 for power monitoring of the power distribution system 100 and send signals to regulate the output each DC-DC power converter 108 based on the signals received if required.

A first converter 120 may be coupled between each current sensors 112 and voltage sensor 114 and the processor 118. In accordance with one embodiment, the converter 120 is an A/D converter which will convert the continuous current and voltage signals of the current sensors 112 and voltage sensor 114 to discrete digital numbers to be read by the processor 118.

A second converter 122 may be coupled between each trim pin 108A of each of the DC-DC power converters 108 and the processor 118. In accordance with one embodiment, the converter 122 is a D/A converter which will convert a digital signal from the processor 118 to an analog signal to adjust a specified trim pin 108A of a specific DC-DC power converter 108.

The processor 118 is generally coupled to a power unit 126. The power unit 126 is used to provide power to the processor 118. The power unit 126 may further provide power to other elements of the control unit 116.

Figure 3:
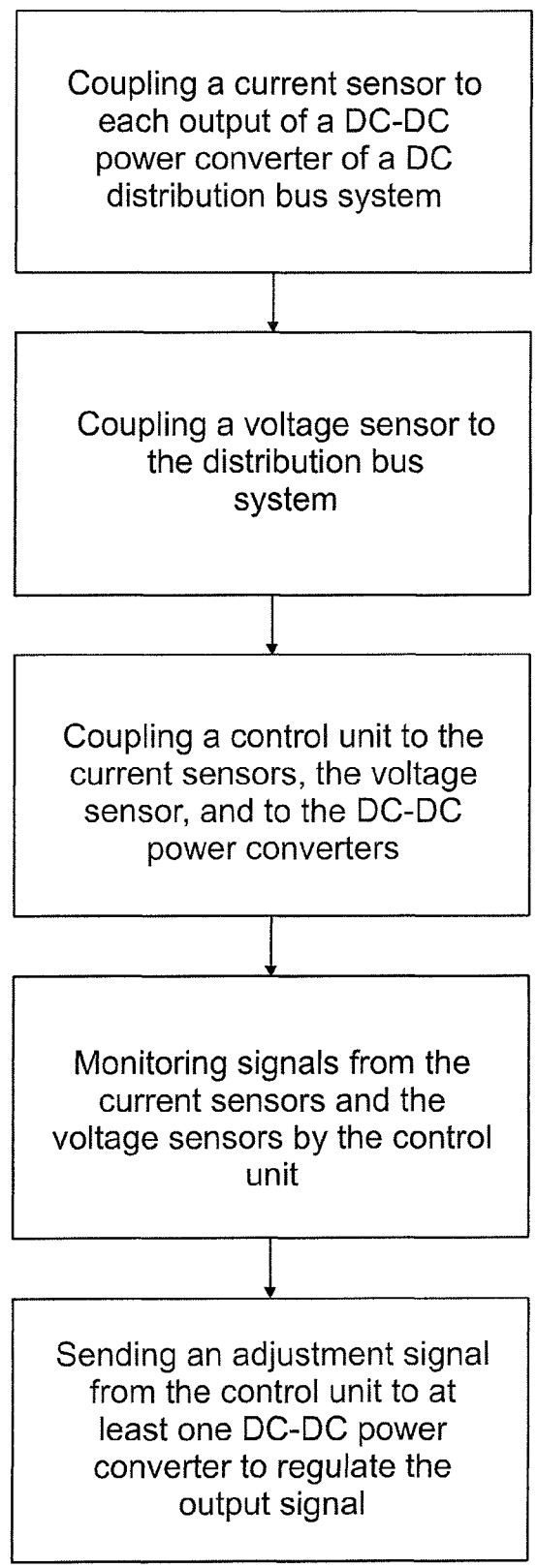
FIG. 3 is a flow chart depicting a method for managing electrical power from fuel cell modules that allows for dynamic power sharing and conditioning for use on a power bus.

Referring to FIG. 3, a method of managing electrical power in the power distribution system 100 is shown. A current sensor 112 is coupled to an output of each of a plurality of DC-DC power converters 108 of the distribution bus 110. A voltage sensor 114 is coupled to the distribution bus 110. A control unit 116 is coupled to each current sensor 112, the voltage sensor 114, and to the plurality of DC-DC power converters 108 to regulate output signals of each DC-DC power converter 108. The control unit 116 will monitor signals from each current sensor 112 and the voltage sensor 114. The control unit 116 will send an adjustment signal to at least one of the DC-DC power converters 108 to regulate the output signal of the DC-DC power converter 108. The control unit 116 is generally coupled to a trim pin 108A of the DC-DC power converter 108. By adjusting the trim pin 108A, the output of the DC-DC power converter 108 can be regulated thereby creating independence between the source (i.e., fuel module) and the DC bus configuration 104.

The power distribution system 100 allows one to control the fuel cell stack power demand by regulating the output of the DC-DC power converters 108. Regulation at this point creates independence between the source (fuel cell) and the DC bus configuration 104. The parameters of the power distribution system 100 are included in the processor 118 of the control unit 116 thereby allowing the control algorithms to be readily updated during development in order to interface various configurations of fuel cell systems. The power distribution system 100 provides the ability to interface multiple fuel cell modules of varying size and to allow power sharing between different fuel cell modules where an even distribution of power is not feasible. The power distribution system 100 further allows the ability to interface multiple fuel cell systems and energy source types, presently not available with existing solutions.

While embodiments of the disclosure have been described in terms of various specific embodiments, those skilled in the art will recognize that the embodiments of the disclosure can be practiced with modifications within the spirit and scope of the claims.

What is claimed is:

1. A system for managing electrical power comprising:
   a plurality of storage devices;
   a plurality of DC-DC power converters, wherein a corresponding individual DC-DC power converter is coupled to each of the plurality of storage devices, outputs of the plurality of DC-DC power converters coupled in parallel to form a distribution bus;
   a plurality of sensors, wherein a corresponding individual sensor is coupled to an output of each of the DC-DC power converters for power monitoring of the system;
   a control unit coupled to the plurality of sensors and to the plurality of DC-DC power converters to regulate an output signal of each DC-DC power converter based on signals received from the sensors;
   wherein each DC-DC power converter has a plurality of trim pins, the control unit is coupled to each DC-DC power converter to select a specific trim pin to allow for incremental changes in the output of a desired DC-DC power converter.

2. A system for managing electrical power in accordance with claim 1 wherein the plurality of storage devices output a DC signal.

3. A system for managing electrical power in accordance with claim 1 wherein the control unit comprises:
   a processor coupled to the plurality of sensors and to the plurality of DC-DC power converters; and
   a power converter coupled to the processor.

4. A system for managing electrical power in accordance with claim 3 wherein plurality of sensors comprises:
   a plurality of current sensors, wherein a corresponding individual current sensor is coupled to each of the plurality of DC-DC power converters and to the processor; and
   at least one voltage sensor coupled to the distribution bus and to the processor.

5. A system for managing electrical power in accordance with claim 3 wherein control unit further comprises:
   a plurality of first converters, wherein each of the plurality of first converters is coupled to one of the plurality of sensors and to the processor; and
   a plurality of second converters, wherein each of the plurality of second converters is coupled to one of the plurality of DC-DC power converters and to the processor.

6. A system for managing electrical power in accordance with claim 5 wherein the plurality of first converters is a plurality of A/D converters.

7. A system for managing electrical power in accordance with claim 5 wherein the second converter is a D/A converter.

8. A system for managing electrical power in accordance with claim 3 wherein the processor is coupled to each trim pin of each of the plurality of DC-DC power converters to regulate the output of each DC-DC power converter.

9. A system for managing electrical power comprising:
   a plurality of storage modules, each storage module outputting a DC signal;
   a plurality of DC-DC power converters, wherein a corresponding individual DC-DC power converter is coupled to each of the plurality of storage modules, outputs of the plurality of DC-DC power converters coupled in parallel to form a distribution bus;
   a plurality of current sensors, wherein a corresponding individual current sensor is coupled to an output of each of the plurality of DC-DC power converters;
   at least one voltage sensor coupled to the distribution bus;
   a control unit coupled to the plurality of current sensors, the at least one voltage sensor, and to the plurality of DC-DC power converters to regulate output signals of each DC-DC power converter; and
   wherein each DC-DC power converter has a plurality of trim pins, the control unit is coupled to each DC-DC power converter to select a specific trim pin to allow for incremental changes in the output of a desired DC-DC power.

10. A system for managing electrical power in accordance with claim 9 wherein the control unit comprises:
    a processor coupled to the plurality of current sensors, the at least one voltage sensor, and to the plurality of DC-DC power converters to regulate output signals of each DC-DC power converters; and
    a power converter coupled to the processor.

11. A system for managing electrical power in accordance with claim 10 wherein control unit further comprises:
    a plurality of first converters, wherein each of the plurality of first converters is coupled to one of the plurality of current sensors or voltage sensor and to the processor; and
    a plurality of second converters, wherein each of the plurality of second converters is coupled to one of the plurality of DC-DC power converters and to the processor.

12. A system for managing electrical power in accordance with claim 11 wherein the plurality of first converters is a plurality of A/D converters.

13. A system for managing electrical power in accordance with claim 11 wherein the second converter is a D/A converter.

14. A system for managing electrical power in accordance with claim 10 wherein the processor is coupled to each trim pin of each of the plurality of DC-DC power converters to regulate the output of each DC-DC power converter.

15. A method for managing electrical power comprising:
    coupling a current sensor to an output of each of a plurality of DC-DC power converters of a DC distribution bus system;
    coupling a voltage sensor to the DC distribution bus system;
    coupling a control unit to the plurality of current sensors, the at least one voltage sensor, and to the plurality of DC-DC power converters to regulate output signals of each DC-DC power converter;
    coupling the control unit to each of a plurality of trim pins in each DC-DC power converter; and
    selecting a specific trim pin by the control unit to allow for incremental changes in the output of a desired DC-DC power.

16. The method of claim 15 further comprising:
    monitoring signals from the current sensors and the voltage sensors by the control unit;
    sending an adjustment signal from the control unit to at least one of the DC-DC power converters to regulate output signals of each DC-DC power converter.

17. The method of claim 15 further comprising:
    coupling a processor coupled to each current sensor, to the voltage sensor, and to the plurality of DC-DC power converters; and
    providing a power converter coupled to the processor.

18. The method of claim 17 further comprising:
    coupling one first converter to each current sensor, and voltage sensor and to the processor; and
    coupling one second converter to each DC-DC power converter and the processor.

19. The method of claim 18 wherein each first converter is an A/D converter.

20. The method of claim 18 wherein each second converter is a D/A converter.

* * * * *